United States Patent
Goodarzi et al.

(10) Patent No.: US 12,304,445 B2
(45) Date of Patent: May 20, 2025

(54) AUTOMATIC TRAILER BRAKE GAIN SCALING SYSTEM AND METHOD USING HITCH FORCES

(71) Applicant: GM GLOBAL TECHNOLOGY OPERATIONS LLC, Detroit, MI (US)

(72) Inventors: Avesta Goodarzi, Whitby (CA); Utkarsh Saini, Pickering (CA); Patrick Giancarlo Gabriel DiGioacchino, Niagara Falls (CA); Hasan Alper Hepguvendik, Milton (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 153 days.

(21) Appl. No.: 18/166,966

(22) Filed: Feb. 9, 2023

(65) Prior Publication Data
US 2024/0270214 A1    Aug. 15, 2024

(51) Int. Cl.
*B60T 7/20* (2006.01)
*B60T 8/1755* (2006.01)
*B60T 8/18* (2006.01)
*B60T 13/66* (2006.01)

(52) U.S. Cl.
CPC .............. *B60T 7/20* (2013.01); *B60T 8/1755* (2013.01); *B60T 8/1856* (2013.01); *B60T 8/1887* (2013.01); *B60T 13/662* (2013.01)

(58) Field of Classification Search
CPC ........ B60T 7/20; B60T 8/1755; B60T 8/1856; B60T 8/1887; B60T 13/662
USPC .......................................................... 701/70
See application file for complete search history.

(56) References Cited

U.S. PATENT DOCUMENTS

| | | | |
|---|---|---|---|
| 3,893,692 A | 7/1975 | Presley et al. | |
| 5,080,445 A | 1/1992 | Brearley et al. | |
| 5,333,948 A | 8/1994 | Austin et al. | |
| 5,713,639 A | 2/1998 | Doto et al. | |
| 6,042,196 A * | 3/2000 | Nakamura | B60T 7/12 303/7 |
| 6,139,118 A | 10/2000 | Hurst et al. | |
| 6,705,684 B1 * | 3/2004 | Garvey | B60T 13/74 188/112 A |
| 7,401,871 B2 * | 7/2008 | Lu | B60T 8/17552 303/146 |
| 8,930,114 B1 | 1/2015 | Reid | |
| 9,020,729 B2 * | 4/2015 | Maitlen | B60T 8/321 701/70 |
| 9,026,311 B1 * | 5/2015 | Pieronek | B60T 8/1708 280/455.1 |
| 9,738,125 B1 | 8/2017 | Brickley et al. | |
| 9,908,377 B2 | 3/2018 | Allcorn et al. | |
| 10,252,589 B2 | 4/2019 | Sielhorst | |
| 10,363,910 B2 | 7/2019 | Kulkarni et al. | |
| 10,670,479 B2 | 6/2020 | Reed et al. | |

(Continued)

*Primary Examiner* — Kurt Philip Liethen
*Assistant Examiner* — John D Bailey
(74) *Attorney, Agent, or Firm* — Lorenz & Kopf LLP (57) ABSTRACT

Methods and systems automatically scale and set trailer brake gain without a need for vehicle driver input and without testing. Scaling a trailer brake gain of a trailer towed by a vehicle includes obtaining sensor data via one or more sensors of the vehicle, including from a hitch load sensor. A processor computes a trailer resistance force of the trailer based on the sensor data. The processor automatically updates the trailer brake gain based on both the sensor data and the trailer resistance force.

20 Claims, 5 Drawing Sheets

(56) References Cited

U.S. PATENT DOCUMENTS

| | | | |
|---|---|---|---|
| 10,703,345 B2 * | 7/2020 | Niedert | B60T 8/172 |
| 10,836,366 B2 * | 11/2020 | James | B60T 8/1708 |
| 11,014,417 B2 | 5/2021 | Reed et al. | |
| 11,084,342 B2 | 8/2021 | Reed et al. | |
| 11,135,882 B2 | 10/2021 | Reed et al. | |
| 11,167,737 B2 * | 11/2021 | Falcon | B60T 8/1708 |
| 11,221,262 B2 | 1/2022 | Reed et al. | |
| 11,225,235 B2 * | 1/2022 | DiGioacchino | B60T 8/1708 |
| 11,485,330 B1 * | 11/2022 | Kulkarni | B60D 1/62 |
| 11,524,663 B2 * | 12/2022 | Prohaszka | B60T 17/22 |
| 2006/0071549 A1 * | 4/2006 | Chesnut | B60T 7/16 |
| | | | 303/3 |
| 2007/0001509 A1 | 1/2007 | Brown et al. | |
| 2011/0042154 A1 | 2/2011 | Bartel | |
| 2014/0046566 A1 | 2/2014 | Maitlen | |
| 2015/0232075 A1 | 8/2015 | Fosdike | |
| 2015/0275991 A1 | 10/2015 | De Leon | |
| 2015/0353063 A1 | 12/2015 | Tuhro et al. | |
| 2017/0001639 A1 | 1/2017 | Dempsey et al. | |
| 2018/0079394 A1 * | 3/2018 | Cekola | B60T 8/1708 |
| 2018/0215358 A1 | 8/2018 | Hall et al. | |
| 2018/0339685 A1 | 11/2018 | Hill et al. | |
| 2019/0225196 A1 * | 7/2019 | Niedert | B60T 8/1806 |
| 2020/0031326 A1 * | 1/2020 | Henriksson | B60T 7/20 |
| 2020/0290579 A1 * | 9/2020 | Lievore | G01G 19/12 |
| 2021/0139008 A1 * | 5/2021 | DiGioacchino | B60T 8/1708 |
| 2022/0017050 A1 | 1/2022 | Lievore | |
| 2023/0227011 A1 * | 7/2023 | Zengin | B60T 8/1755 |
| | | | 701/70 |
| 2023/0242084 A1 | 8/2023 | Fosdike | |
| 2024/0042976 A1 | 2/2024 | Kirmaier et al. | |
| 2024/0067148 A1 | 2/2024 | Ripley et al. | |
| 2024/0208473 A1 | 6/2024 | Lievore | |
| 2024/0262322 A1 * | 8/2024 | Castillo | B60D 1/06 |

* cited by examiner

AUTOMATIC TRAILER BRAKE GAIN SCALING SYSTEM AND METHOD USING HITCH FORCES

INTRODUCTION

The present disclosure relates to methods and systems for controlling braking of a trailer hitched to a vehicle, and more particularly relates to automatic and continuous setting of optimal gain using vehicle signals and a force sensor at the hitch.

Many vehicles are equipped for towing a trailer that is selectively coupled to the vehicle. Some of these vehicles include functionality for controlling the brake signal sent to the trailer to scale the braking force applied by the trailer brakes. This requires a trailer brake controller that may be original equipment on a vehicle or may be added as an aftermarket product. The trailer brake controller allows the driver to control the intensity of the signal sent to the trailer's brakes to suit the operating conditions. For example, it may be desirable for the trailer brakes to apply a higher relative force when the weight of the load on the trailer is higher. Delivering the appropriate signal intensity involves several steps to set the gain using the trailer brake controller. The controller has a range of gain levels (such as 1-10), covering a minimum to maximum signal intensity.

Setting the gain may involve manually making an initial selection, testing the braking response of the trailer, making an adjustment to the gain setting, and repeating until an acceptable amount of braking force results. The routine involves a number of steps and should be repeated every time operating conditions change. In addition, testing, such as by operating the brakes and observing the response of the trailer is undertaken. Finding the optimum setting may be challenging. Setting the gain too high may result in the trailer wheels undesirably locking up during braking. Setting the gain too low means the towing vehicle's brakes do the majority of the work, leading to suboptimal stopping distances.

Accordingly, it is desirable to provide improved methods and systems for controlling braking of a trailer that is coupled to a vehicle. It would also be desirable to set the gain without making manual selections and to provide optimal control of the braking of the trailer at various different speeds and conditions. Furthermore, other desirable features and characteristics of the present disclosure will become apparent from the subsequent detailed description and the appended claims, taken in conjunction with the accompanying drawings and the foregoing technical field and background.

SUMMARY

Methods and systems automatically set trailer brake gain without a need for vehicle driver input and without testing. In a number of embodiments, a method for scaling a trailer brake gain of a trailer towed by a vehicle includes obtaining sensor data via one or more sensors of the vehicle, including from a hitch load sensor. A processor computes a trailer resistance force of the trailer based on the sensor data. The processor automatically updates the trailer brake gain based on both the sensor data and the trailer resistance force.

In additional embodiments, obtaining sensor data includes, obtaining a vertical force on a hitch of the vehicle, a longitudinal force on the hitch of the vehicle, a speed of the vehicle, an acceleration of the vehicle, and a steering angle of the vehicle.

In additional embodiments, the processor computes an optimum hitch force as a function of a vertical force on a hitch of the vehicle and deceleration of the vehicle.

In additional embodiments, updating the trailer brake gain includes adjusting the trailer brake gain by a gain change value that is based on an error between an optimum longitudinal hitch force and an actual average longitudinal hitch force.

In additional embodiments, the trailer resistance force is estimated based on resistance force coefficients that are computed only when the vehicle is not braking.

In additional embodiments, the processor computes the trailer brake gain based on an optimum longitudinal hitch force that is a function of the trailer resistance force.

In additional embodiments, an optimum longitudinal force applied by the trailer to a hitch of the vehicle is computed as a function of a vertical force of the trailer on the hitch of the vehicle, acceleration, and the trailer resistance force.

In additional embodiments, an actual longitudinal hitch force and an optimum longitudinal hitch force are computed. A product of a gain constant multiplied by a difference between the actual longitudinal hitch force and the optimum longitudinal hitch force is computed.

In additional embodiments, updating the gain is accomplished entirely and independently by the processor without manual input.

In additional embodiments, an identifier module computes the trailer resistance force using an identification method.

In a number of additional embodiments, a system for scaling a trailer brake gain of a trailer towed by a vehicle includes sensors of the vehicle providing sensor data. The sensors include a hitch load sensor. A processor computes, based on the sensor data, a trailer resistance force of the trailer, and automatically update the trailer brake gain based on both the sensor data and the trailer resistance force.

In additional embodiments, the vehicle includes a hitch for coupling with the trailer. The sensor data includes a vertical force on the hitch, a longitudinal force on the hitch, a speed of the vehicle, an acceleration of the vehicle, and a steering angle of the vehicle.

In additional embodiments, the processor computes an optimum longitudinal force as a function of a vertical force on a hitch of the vehicle, the trailer resistance force, and deceleration of the vehicle.

In additional embodiments, when the trailer brake gain is automatically updated, the processor adjusts the trailer brake gain by a gain change value that is based on an error between an optimum longitudinal hitch force and an actual average longitudinal hitch force.

In additional embodiments, the trailer resistance force is estimated based on resistance force coefficients that are computed only when the vehicle is not braking.

In additional embodiments, the processor computes the trailer brake gain based on an optimum longitudinal hitch force that is a function of the trailer resistance force.

In additional embodiments, the processor computes an optimum longitudinal force applied by the trailer to a hitch of the vehicle as a function of acceleration, the trailer resistance force, and a vertical force of the trailer on the hitch of the vehicle.

In additional embodiments, the processor computes an actual longitudinal hitch force and an optimum longitudinal hitch force. A product of a gain constant multiplied by a difference between the actual longitudinal hitch force and the optimum longitudinal hitch force is computed.

In additional embodiments, the processor automatically updates the trailer brake gain entirely and independently by the processor without manual input.

In a number of other embodiments, a vehicle includes a body that may be coupled, via a hitch, to a trailer that has a trailer braking system. Sensors obtain sensor data for the vehicle, which includes a longitudinal force and a vertical force on the hitch, and a deceleration of the vehicle. A processor is coupled with the sensors and based on the sensor data, computes a trailer resistance force of the trailer. Based on the sensor data and the trailer resistance force, the processor computes an optimum force on the hitch. An error is determined between the optimum force on the hitch and an actual force on the hitch that is obtained from the sensor data. The processor automatically updates a trailer brake gain to eliminate the error between the optimum force on the hitch and the actual force on the hitch.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
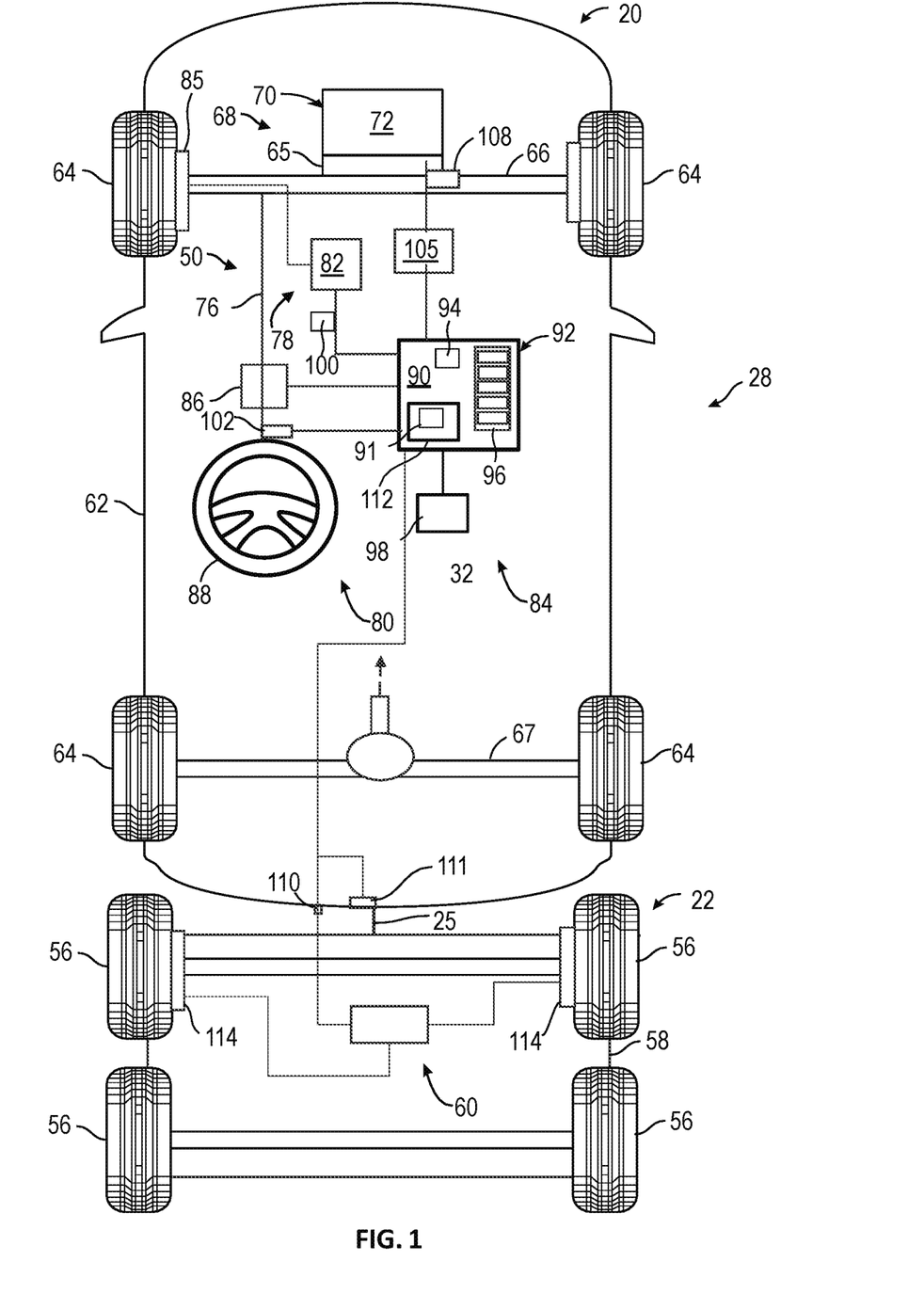
FIG. 1 is a functional block diagram of a vehicle-trailer system, in accordance with exemplary embodiments.

With reference to FIG. 1, certain features of a vehicle-trailer system 28 are illustrated in functional block diagram form, including a vehicle 20 and a trailer 22. It will be appreciated that the vehicle 20 is adapted to operate as a tow-vehicle for towing a trailer, such as the trailer 22. In various embodiments, the vehicle 20 is an automobile. The vehicle 20 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 20 may also comprise another type of mobile platform.

In various embodiments, the trailer 22 may comprise any number of different types of trailers and/or other types of mobile platforms, for example that are coupled to the vehicle 20 and move along with the vehicle 20. As depicted in FIG. 1, in various embodiments, the trailer 22 includes, among other features, a plurality of wheels 56, a body 58, and a braking system 60. While the trailer 22 is depicted as having four wheels 56, it will be appreciated that the number of wheels 56 may vary in different embodiments.

The trailer 22 may be releasably coupled with the vehicle 20 by a hitch 25 for travel over the roadway 24. The hitch 25 may be configured as any of various types including ball-type, fifth-wheel, goose-neck, etc. As used herein, "vehicle" may refer to a host vehicle, such as the vehicle 20, that tows a towed vehicle "trailer," such as the trailer 22. The term tow-vehicle may also be used to refer to the vehicle 20 doing the towing. In embodiments, a motorized automobile may serve as the vehicle 20 towing the trailer 22 in a vehicle-trailer system 28. The trailer 22 is illustrated for representation purposes and may be any mobile apparatus being towed by the vehicle 20, such as a boat trailer, a camping trailer, a utility trailer, a specialized type of mobile equipment, etc.

As depicted in FIG. 1, the vehicle 20 includes a body 62 that is arranged on or integrated with a chassis. The body 62 substantially encloses other components of the vehicle 20. The vehicle 20 also includes a plurality of wheels 64. The wheels 64 are each rotationally coupled to the chassis near a respective corner of the body 62 to facilitate movement of the vehicle 20. In one embodiment, the vehicle 20 includes four wheels 64, although this may vary in other embodiments (for example for trucks and certain other vehicles).

A drive system 68 is mounted in the vehicle 20, and drives the wheels 64, for example via axles 66, 67. In certain embodiments, the drive system 68 comprises a propulsion system 70. In certain exemplary embodiments, the propulsion system 70 comprises a powerplant 72, such as an internal combustion engine and/or an electric motor/generator, that is coupled with a transmission 65. In certain embodiments, the drive system 68 may vary, and/or two or more drive systems 68 may be used. By way of example, the vehicle 20 may also incorporate any one of, or combination of, a number of different types of propulsion systems 70, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle 20 also includes a braking system 78 and a steering system 80 in various embodiments. In exemplary embodiments, the braking system 78 controls braking of the vehicle 20 using an actuator 82 that may be controlled via inputs provided by a driver, such as through a brake pedal as the actuator 82, and in certain embodiments, via automatic control by a control system 84. The braking system 78 incudes brakes, such as brake 85, at any of the number of wheels 64. Also in exemplary embodiments, the steering system 80 controls steering of the vehicle 20 via an actuator 86, such as with inputs from a steering wheel 88 (e.g., in connection with a steering column coupled to the axle 66 and/or the wheels 64), that are controlled via inputs provided by a driver, and in certain embodiments via automatic control via the control system 84.

In the embodiment depicted in FIG. 1, the control system 84 is coupled with various systems including the braking system 78 and the steering system 80 of the vehicle 20, as well as with the braking system 60 of the trailer 22. In various embodiments, the control system 84 may also be coupled to one or more other systems and/or components of the vehicle 20 and/or the trailer 22 and includes a controller 90 and a gain control module 91. As illustrated in FIG. 1, the controller 90 and the gain control module 91 are a part of, or comprise, a computer system 92. It will be appreciated that the controller 90 may otherwise differ from the example depicted in FIG. 1. The controller 90 may be configured as any number of controllers and/or microcontrollers in communication with each other. The gain control module 91 may be integrated with the controller 90, or may be separate from the controller 90 and may be coupled therewith and with the trailer brake system 60. In general, the gain control module 91 scales the signal sent to the trailer brake system 60 based on a parameters and values determined as described herein, to brake the trailer 22 when the braking system 78 is operated to brake the vehicle 20.

As illustrated in FIG. 1, the controller 90 is coupled with various devices and systems of the vehicle 20, such as the braking system 78 and the steering system 80. The controller 90 may accept information from various sources, process that information, and provide control commands based thereon to effect outcomes such as operation of the vehicle 20 and its systems, including of the braking system 78. In the depicted embodiment, the controller 90 includes a processor 94 and a memory device 96, and is coupled with a storage device 98. The processor 94 performs the computation and control functions of the controller 90, and may comprise any type of processor or multiple processors, single integrated circuits such as a microprocessor, or any suitable number of integrated circuit devices and/or circuit boards working in cooperation to accomplish the functions of a processing unit. During operation, the processor 94 may execute one or more programs and may use data, each of which may be contained within the storage device 98 and as such, the processor 94 controls the general operation of the controller 90 in executing the processes described herein, such as the processes and methods described in greater detail below.

The memory device 96 may be any type of suitable memory. For example, the memory device 96 may include volatile and nonvolatile storage in read-only memory (ROM), random-access memory (RAM), and keep-alive memory (KAM), for example. KAM is a persistent or non-volatile memory that may be used to store various operating variables while the processor 94 is powered down. The memory device 96 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 90. In the depicted embodiment, the memory device 96 may store the above-referenced programs along with one or more stored values of the data such as for short-term data access.

The storage device 98 stores data, such as for long-term data access for use in automatically controlling the vehicle 20 and its systems. The storage device 98 may be any suitable type of storage apparatus, including direct access storage devices such as hard disk drives, flash systems, floppy disk drives and optical disk drives. The storage device 98 comprises a non-transitory computer readable medium configured to store programs and data, such as on parameters of the vehicle 20 and the trailer 22. In one exemplary embodiment, the storage device 98 comprises a source from which the memory device 96 receives the programs that execute one or more embodiments of one or more processes of the present disclosure. In another exemplary embodiment, the programs may be directly stored in and/or otherwise accessed by the memory device 96. The programs represent executable instructions, used by the controller 90 in processing information and in controlling the vehicle 20 and its systems, including the braking system 78. While the components of the control system 84 are depicted as being part of the same system, it will be appreciated that in certain embodiments these features may comprise multiple systems. In addition, in various embodiments the control system 84 may comprise all or part of, and/or may be coupled to, various other vehicle devices and systems, such as, among others, the propulsion system 70 and/or other systems of the vehicle 20.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 94) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 92 of the controller 90 may also otherwise differ from the embodiment depicted in FIG. 1.

The controller 90 is coupled with various actuators including the actuators 82, 86 and the propulsion system 70. The controller 90 is also coupled with various sensors that sense observable conditions of the vehicle-trailer system 28. In this embodiment, the sensing devices include, but are not limited to, a braking sensor 100 such as a pedal position sensor, a steering angle sensor 102, an acceleration sensor, such as an inertial measurement unit (IMU) 104, a torque request sensor 105, such as at the accelerator pedal or throttle, and a hitch load sensor 111. The IMU 104 may include accelerometers and gyroscopes, which may be in electronic form to provide motion, position, and navigational sensing over a number of degrees of freedom. For example, microelectromechanical system (MEMS) devices may be used to sense translation such as surge, heave, sway and rotation such as roll, pitch and yaw. The hitch load sensor 111 may be located at the hitch 25 to monitor forces between the trailer 22 and the vehicle 20. The hitch load sensor 111 may be a multi-axis force sensor such as a load cell that simultaneously measures forces, such as via strain gages, in a number of axis. For example, the hitch load sensor 111 may be a biaxial device that measures longitudinal forces in the x-axis and vertical forces in the z-axis at the hitch 25. In other embodiments, the hitch load sensor 111 may measure additional forces, such as in three-axes. The forces may be referred to as hitch forces or may be referred to as trailer forces and they relate to forces that the trailer 22 applies to the hitch 25 of the vehicle 20.

In various embodiments, the braking sensor 100 is included in the braking system 78 of the vehicle 20, and measures an amount of braking relating thereto. In certain embodiments, the braking sensor 100 measures an amount of engagement thereof by a driver of the vehicle 20 (e.g., a measured amount of brake pedal travel and/or brake pedal force of the brake pedal and/or applied thereto based on engagement of the brake pedal by the driver). Also in various embodiments, the steering angle sensor 102 is included in the steering system 80 of the vehicle 20, and measures an indication of steering relating thereto. In certain embodiments, the steering angle sensor 102 measures an angle of the steering wheel 88 resulting from engagement of the steering wheel 88 by the driver. In various embodiments, a speed sensor 108 measures an amount of speed (and/or changes thereof) of the vehicle 20. In certain embodiments, the speed sensor 108 comprises a rotational speed sensor monitoring the driveline of the vehicle 20. In various embodiments, the IMU 104 measures inertial measurement data and/or related parameters of the vehicle 20, which may include acceleration and a grade or slope on which the vehicle 20 is travelling. In a number of embodiments, the hitch load sensor 111 measures force at the hitch 25, such as between the trailer 22 and the vehicle 20.

In various embodiments, the controller 90 is coupled to, among other devices, the sensors, the braking system 78 of the vehicle 20, and the braking system 60 of the trailer 22. For example, the trailer 22 may be electrically coupled with the vehicle 20 through a connector 110, such as a multi-pin electrical connector. In certain embodiments, the controller 90 may also be coupled with the steering system 80, the propulsion system 70, and/or one or more other systems, devices, and/or components of the vehicle 20 and/or the trailer 22. In various embodiments, the controller 90 receives sensor data, processes the sensor data, and controls braking of the vehicle 20 and of the trailer 22 (via the vehicle braking system 78 and the trailer braking system 60, respectively), based on the processing of the sensor data, such as described further below. The controller 90 may provide the gain control functions of the vehicle-trailer system 28. In embodiments, a gain controller 112 may be coupled in the control system 84 and in certain embodiments may be included in the controller 90. In embodiments, the gain control module 91 may reside in, or may comprise, the gain controller 112. The gain controller 112 may provide the function of controlling the intensity of the braking signal sent to the braking system 60 of the trailer 22, such as from the controller 90 and/or the gain control module 91. The gain controller 112 and/or the gain control module 91 is/are configured to vary the signal intensity (gain level) as further described below. The brake system 60 of the trailer 22 responds to the braking signal to apply the brakes 114 in proportion to the signal's intensity. Accordingly, the gain controller 112/gain control module 91 controls how hard the brakes 114 are applied in relation to the application of the brakes 85 of the vehicle 20. The signal intensity (gain) may be adjusted as further described below. In embodiments, the gain controller 112/gain control module 91 may include no operator/driver interface. In embodiments, a data information center (not shown) of the vehicle 20 may include a display of gain setting information for driver reference purposes only.

While certain parameters of the vehicle-trailer system 28 may be directly measured, such as the extent of brake actuation via the braking sensor 100, the steering angle via the steering angle sensor 102, acceleration via the IMU 104, and trailer forces via the hitch load sensor 111, others may be derived or estimated. For example, the resistance force of the trailer 22 may be computed by the controller 90 as further described below.

Figure 2:
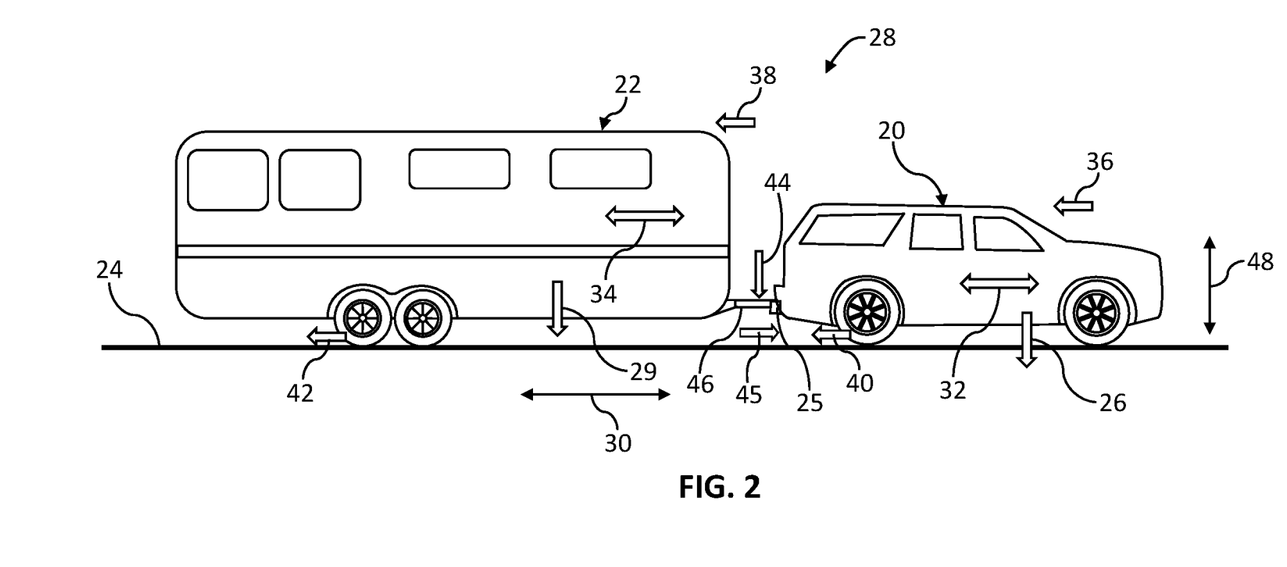
FIG. 2 is a schematic illustration of a vehicle-trailer system showing various parameters, in accordance with exemplary embodiments.

Referring to FIG. 2, the vehicle-trailer system 28 is schematically illustrated with the vehicle 20 towing the trailer 22 and travelling on a roadway 24. When the vehicle-trailer system 28 operates on the roadway 24 various parameters may be used to describe the vehicle 20 and/or the trailer 22. The vehicle 20 has a weight ($W_V$) 26, and the trailer has a weight ($W_T$) 29. The vehicle 20 and the trailer 22 will have a common acceleration ($a_x$) value in the longitudinal direction (x) 30. The acceleration/$a_x$ may be an increasing acceleration, a zero acceleration, or a decreasing acceleration (deceleration). The inertia force ($F_{aV}$) 32 of the moving vehicle 20 is its mass multiplied by its acceleration ($m_V a_x$). The inertia force ($F_{aT}$) 34 of the moving trailer 22 is its mass multiplied by acceleration ($m_T a_x$). When moving, the vehicle 20 works against a resistance force ($F_{RV}$) 36, and the trailer 22 works against a resistance force ($F_{RT}$) 38. The resistance forces $F_{RV}$ 36 and $F_{RT}$ 38 may include components that account for aerodynamics/air resistance, rolling resistance, and resistance due to a gradient (slope) of the roadway 24. When the brakes are applied, the vehicle 20 experiences a braking force ($F_{BV}$) 40, and the trailer 22 experiences a braking force ($F_{BT}$) 42. The trailer 22 applies a trailer vertical force ($F_{ZT}$) 44 at its tongue 46 to the hitch 25 of the vehicle 20 in the vertical direction (z) 48. The trailer 22 applies a trailer longitudinal force ($F_{XT}$) 45 at its tongue 46 to the hitch 25 of the vehicle 20 in the longitudinal direction/x 30. The trailer 22 has a trailer vertical axle load ($Fa=W_T-F_{ZT}$) 50. As further described below; these various parameters may be known values, may be determined, or may be estimated. The parameters may be used to evaluate/define various aspects of the vehicle 20 and/or of the trailer 22 and to make control determinations.

Figure 3:
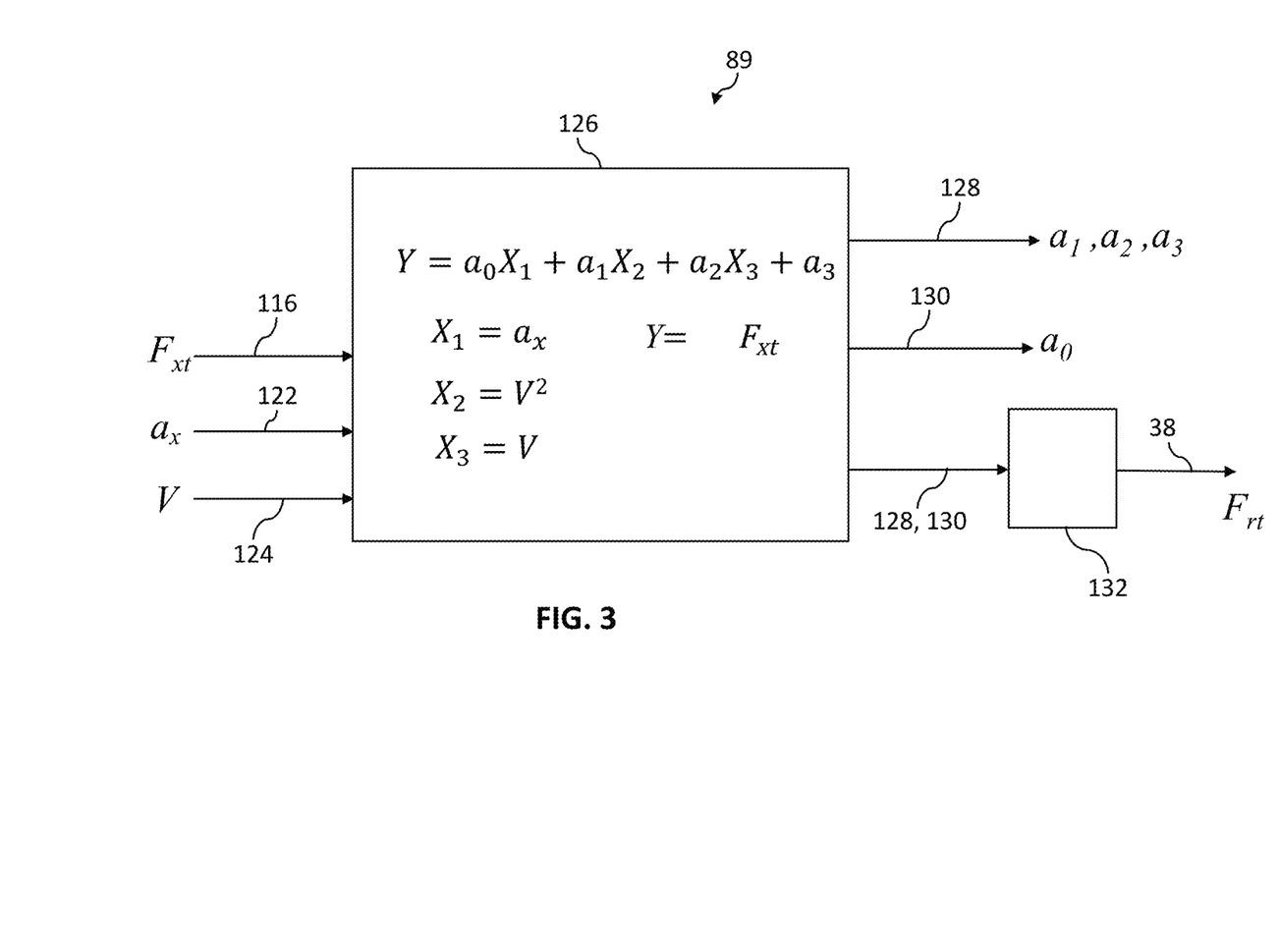
FIG. 3 is a functional block diagram of a system for determining parameters of the trailer of FIG. 1, in accordance with exemplary embodiments.

Referring additionally to FIG. 3, a system 89 for determining certain parameters of the trailer 22 is illustrated. The system 89 may be operated by the controller 90 via the processor 94, such as by the gain control module 91, or another module. Trailer hitch longitudinal force/$F_{XT}$ 45 of the trailer 22 relative to the vehicle 20 may be received by, or determined by, the controller 90, such as by using a signal 116, such as from the hitch load sensor 111. Acceleration of the trailer 22, or of the vehicle 20 or of the vehicle-trailer system 28 may be received by, or determined by, the controller 90, such as by using a signal 122 from the IMU 104, or from another acceleration sensor of the vehicle 20. Speed of the vehicle 20 may be received by, or determined by, the controller 90 using a signal 124, such as from the speed sensor 108 of the vehicle 20. The processor 94 may, via an identifier module 126, compute resistance force coefficients ($a_1$, $a_2$, $a_3$) 128 and mass ($a_0$) 130 of the trailer 22 as further described below. In embodiments, these values may be computed for the trailer 22 and/or for the vehicle 20. The computed values may be stored, such as in the storage device 98. With the resistance force coefficients ($a_1$, $a_2$, $a_3$) 128 and the mass ($a_0$) 130 determined, the resistance force ($F_{RT}$) 38 of the trailer 22 may be computed by a resistance force module 132, as further descried below and may be stored, such as in the storage device 98.

Figure 4:
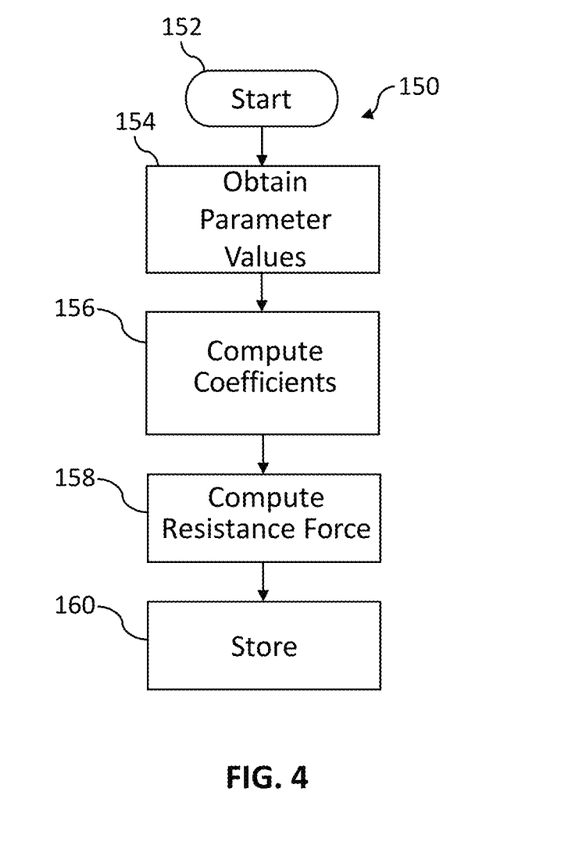
FIG. 4 is a flowchart of process for computing parameters of the trailer of FIG. 1, in accordance with exemplary embodiments, and that may be used in the process of FIG. 5.

Referring to FIG. 4, the parameters including the resistance force coefficients/$a_1$, $a_2$, $a_3$ 128, and the mass/$a_0$ 130, and as a result the resistance force ($F_{RT}$) 38 of the trailer 22, may be computed according to a method 150, such as via the system 89. As will be appreciated in light of the disclosure, the order of operation within the method 150 is not limited to the sequential execution as illustrated in FIG. 4, but may be performed in one or more varying orders as applicable and in accordance with the present disclosure. In various embodiments, the method 150 starts 152 and may be scheduled to run based on one or more predetermined events, and/or may run continuously during operation of the vehicle 20 or when the trailer 22 is connected as indicated by coupling of the connector 110. In the method 150, available parameter values are obtained 154 by the processor 94. For example, acceleration/$a_x$, velocity/V, and trailer longitudinal force/$F_{XT}$ 45 may be obtained from the respective sensors IMU 104, speed sensor 108, and hitch load sensor 111.

When the vehicle 20 is in a non-braking event (not braking), certain coefficients of the trailer 22, and/or of the vehicle-trailer system 28 related to resistance force and the mass may next be computed 156, and the trailer resistance force/$F_{RT}$ 38 may be estimated computed 158. The resistance force coefficients/$a_1$, $a_2$, $a_3$ 128 and mass coefficient/$a_0$ 130 computation 156 may be undertaken at any time the brakes 85 are not activated for the vehicle 20 (and therefore the trailer 22). The resistance force may be estimated/computed 158 continuously or when desired using the computed 156 resistance force and the mass coefficients. In general, mass multiplied by acceleration plus resistance equals hitch longitudinal force/$F_{XT}$ 45, which in equation form is:

$$F_{XT} = W_T\left(\frac{a_x}{g}\right) + F_{RT}.$$

The relationship may further be represented by the equation: $F_{XT}=a_0 a_x + a_1 V^2 + a_2 V + a_3$, from which the resistance force coefficients/$a_1$, $a_2$, $a_3$ 128 and the mass coefficient/$a_0$ 130 may be computed 156, such as by the processor 94. In the equation, $a_0 a_x$ represents the mass component and $a_1 V^2 + a_2 V + a_3$ represents the resistance force component of the previous equation $$F_{XT} = W_T\left(\frac{a_x}{g}\right) + F_{RT}.$$

Acceleration/$a_x$, velocity/V, and hitch longitudinal force/$F_{XT}$ 45 are obtained via sensed values. The computation 156, such as by the identifier module 126, may use an identification method such as least squares, or may employ another type of algorithm for parameter identification. The computation 156 may use the quadratic form: $Y=a_0 X_1 + a_1 X_2 + a_2 X_3 + a_3$, where Y is hitch longitudinal force/$F_{XT}$ 45, $X_1$ is vehicle acceleration, $X_2$ is velocity squared ($V^2$), and $X_3$ is velocity/V. Using the selected identification method, the quadratic form may be solved to simultaneously find the resistance force coefficients/$a_1$, $a_2$, $a_3$ 128 and the mass/$a_0$ 130 of the vehicle 20. Resistance force/$F_{RT}$ 38 may be computed 158, such as by the resistance force module 132, using: $F_{RT}=a_1 V^2 + a_2 V + a_3$ and employing the computed 156 resistance force coefficients/$a_1$, $a_2$, $a_3$ 128 and the measured velocity/V. Through the method 150, the computed 158 trailer resistance force/$F_{RT}$ 38 is obtained and then stored 160, such as in the storage device 98 and/or delivered to/obtained by the processor 94.

Figure 5:
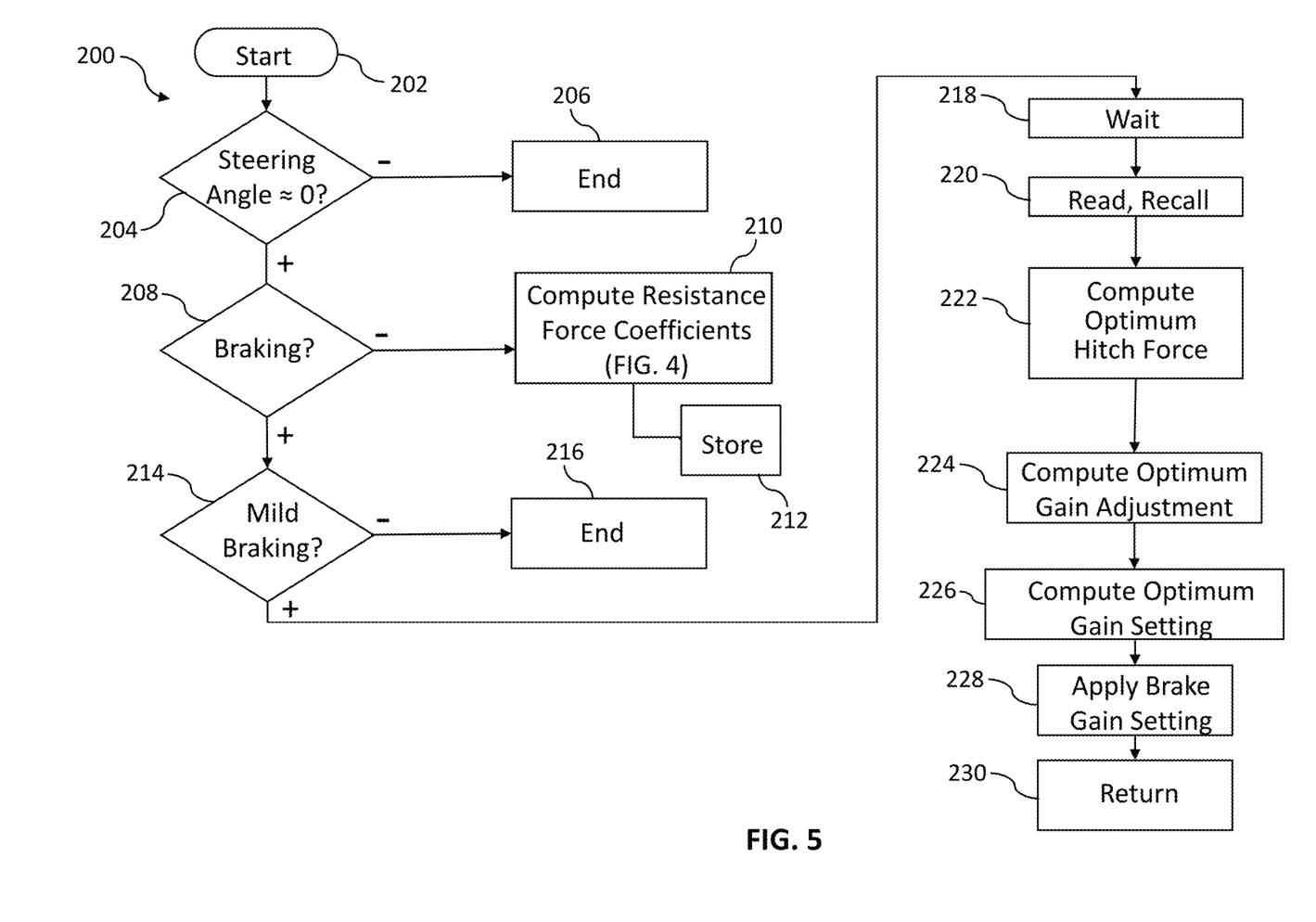
FIG. 5 is a flowchart of process for computing and applying trailer brake gain for the vehicle-trailer system of FIG. 1, in accordance with exemplary embodiments.

Referring to FIG. 5, a method 200 for scaling trailer brake gain is illustrated in flow chart form. The order of operation within the method 200 is not limited to the sequential execution as illustrated in FIG. 5, but may be performed in one or more varying orders as applicable and in accordance with the present disclosure. In various embodiments, the method 200 starts 202 and may be scheduled to run based on one or more predetermined events, such as when the trailer 22 is coupled with the vehicle 20 and operating on the roadway 24, and/or may run continuously during operation of the vehicle 20. A determination 204 is made as to whether the vehicle, five 20 is driving in a substantially straight line. For example, using input from the steering angle sensor 102, the processor 94 may compare the sensed steering angle (δ) to a substantially straight steering angle ($δ_0$). For example, the determination 204 may be whether /δ/<$δ_0$. Substantially straight may, for example, mean the steering is approximately straight, e.g., steering wheel is within ±5° of straight, without substantial turning in either the left or the right direction. For example, the determination 204 may be whether the absolute value of the steering angle is below a threshold, such as five-degrees, or another value such as ten-degrees or less. When the determination 204 is negative, meaning the vehicle 20 is not operating in a substantially straight line, the method 200 ends 206 and no trailer gain scaling changes are made. In embodiments, the method 200 may proceed to run after the determination 204, such as by returning to the start 202 step.

When the determination 204 is positive, meaning the vehicle 20 is operating in a substantially straight line, the method 200 proceeds to a determination 208 as to whether the vehicle 20 is in a braking event. For example, the determination 208 may be whether the vehicle 20 is decelerating/$a_x$ at a rate of greater deceleration than (less than), a threshold amount ($a_b$). For example, the determination may include an evaluation by the processor 94 as to whether $a_x < a_b$. The threshold amount/$a_b$ may be referenced, such as from the storage device 98, and may be set such that it provides an indication that the vehicle 20 is in a braking event and not just coasting. The threshold amount/$a_b$ may be determined and set using modelling and/or testing, such as during calibration of the controller 90. When the determination is negative, meaning the vehicle 20 is not in a braking event, the method 200 proceeds to compute 210 the resistance force coefficients/$a_1$, $a_2$, $a_3$ 128 and the mass coefficient/$a_0$ 130 from which the trailer resistance force/$F_{RT}$ 38 of the trailer 22 may be estimated. The resistance force coefficients/$a_1$, $a_2$, $a_3$ 128 and the mass coefficient/$a_0$ 130 may be stored, such as in the storage device 98 for use in computing the resistance force/$F_{RT}$ 38. For example, using the method 150 of FIG. 4, the resistance force/$F_{RT}$ 38 of the trailer 22 may be computed 210 continuously or when needed. The resistance force/$F_{RT}$ 38 of the trailer 22 is stored 212, such as in the storage device 98. Accordingly, the method 150) may be carried out as a part of the method 200, such as at the compute 210 step. In embodiments, the mass and the resistance force coefficients may be computed any time the vehicle 20 is not braking.

Continuing with the method 200, when the determination 208 is positive, meaning the vehicle 20 is in a braking event, such as by decelerating such that $a_x$ being less than $a_b$, the method 200 determines 214 whether the braking event is mild. For example, the determination 214 may evaluate whether $a_x > a_{max}$ and $V_{min} < V < V_{max}$. What this means is that the deceleration/$a_x$ of the vehicle does not surpass a threshold deceleration $a_{max}$ and the velocity/V of the vehicle 20 (and the trailer 22) is between a minimum speed ($V_{min}$) and a maximum speed ($V_{max}$). The values for $a_{max}$, $V_{min}$ and $V_{max}$ may be determined using modelling and/or testing and may be set during calibration at levels to avoid extreme conditions ensuring that the braking event is mild, meaning it is a routine braking event of the vehicle 20 where neither speed nor deceleration is above a routine operational level for the vehicle 20. When the determination 214 is negative, meaning the braking event is not mild, the method 200 returns to start 202 and/or ends 216 and waits to be retriggered.

When the determination 214 is positive, meaning the braking event is mild, the method 200 proceeds to wait 218 for a time ($T_d$) for the trailer brakes to complete any transient response (i.e., to reach a steady state condition). The length of $T_d$ may be predetermined and stored, such as in the storage device 98, and may be referenced by the processor 94. Following the waiting 218, the method 200 proceeds to read 220 data and certain parameters which may have been previously stored, such as in the storage device 98, or which may be determined from the various sensors. In embodiments, the processor 94 obtains data including deceleration ($a_x$) from the IMU 104, and trailer forces ($F_{ZT}$, $F_{XT}$) from the hitch load sensor 111. In addition, the processor 94 obtains trailer resistance force/$F_{RT}$, such as originating from the method 150 and stored/retrieved from the storage device 98.

The method 200 proceeds to compute 222 an optimum hitch force ($F_{xt-opt.}$), which is a function of vertical hitch force/$F_{zt}$ 44 and deceleration/$a_x$. The processor 94 may compute 222 the optimum hitch force using the relationship:

$$F_{xt-opt.} = F_{zt}\left(\frac{a_{x-avg.}}{g}\right) + F_{RT}.$$

The average deceleration $a_{x-avg.}$ is an average over a short period of time (e.g., a small fraction of a second) to eliminate noise error in readings of the sensor (IMU 104). For example, noise may have a relatively high frequency in the area of 100 Hz and it is desirable to read the low frequency trend of the signal 122. Accordingly, the average may be taken over some time longer than 0.1 second. The optimum hitch force/$F_{xt-opt.}$ that is computed 222 may be saved, such as in the storage device 98. In embodiments, the trailer resistance force/$F_{RT}$ 38 may be computed at this step using the stored resistance force coefficients/$a_1$, $a_2$, $a_3$ 128 and the mass coefficient/$a_0$ 130.

The computed 222 optimum hitch force/$F_{xt-opt.}$ is compared to the actual hitch force/$F_{xt-avg.}$ to compute 224 the gain adjustment needed to make the actual hutch force/$F_{xt}$ equal to the optimum hitch force $F_{xt-opt.}$. The method 200 computes 224, such as via the processor 94, an optimum gain change $\Delta G_{opt.}$ that is the amount that the gain is to be changed (scaled) to set the gain at a current optimal level. In other words, the size of the error that needs to be eliminated to reach the optimum hitch force for optimum braking of the trailer 22 is determined. For the computation 224, the processor 94 may use: $\Delta G_{opt.} = K_g(F_{xt-opt.} - F_{xt-avg.})$. In the foregoing equation, $K_g$ is a constant that adjusts the error to a scale consistent with the gain settings of the gain controller 112. For example, the gain setting may be in a range of 1-10 units and the trailer forces may be in the range of hundreds of Newtons or more than a thousand newtons. $K_g$ is determined during the calibration phase of the control system 84 and may be set as a constant used for all trailers coupled with the vehicle 20. The constant may be determined by modelling and/or testing. Setting the constant at too high of a value may result in excessive swings in the gain setting and setting the constant too low may lead to an excessive number of iterations to eliminate the error. Accordingly, the constant is set, via calibration, to result in error elimination during one or two gain adjustment iterations. The $\Delta G_{opt.}$ value that is computed 224 may be saved, such as in the storage device 98.

With the gain adjustment value computed 224, the method 200 proceeds to compute 226 the optimum gain setting. The gain control module 91 will have a previous gain setting ($G_{opt.-old}$) that is in use. The processor 94 may reference the previous gain setting, such as from the storage device 98 or from the gain control module 91. The processor 94 may also reference the computed 224 $\Delta G_{opt.}$ value, such as from the storage device 98. The new optimum gain setting ($G_{opt.}$) may be computed 226, such as by the processor 94, using: $G_{opt.} = \Delta G_{opt.} + G_{opt.-old}$. The $G_{opt}$ that is computed 226 is applied 228 to the gain control module 91 for use in additional braking events. When the braking system 78 of the vehicle 20 is operated, such as by the actuator 82/brake pedal, the controller 90 sends a signal, such as through the gain control module 91, to the braking system 60 of the trailer for operation of the brakes 114 using the $G_{opt.}$ value to brake the trailer 22. The automatically computed 226 gain is used with no post setting testing and no driver/operator involvement or interaction. Accordingly, the gain scaling and setting is transparent to the human driver and is completed with the driver undertaking normal driving activities with no special maneuvers or braking needed. Specifically, the driver does not need to activate the brakes to test the gain setting. In addition, the optimum gain is continuously set during operation of the vehicle 20, using only speed, acceleration, steering angle, hitch load, and brake actuation sensors. As such, the braking systems 78, 60 reacts to changing road and/or load conditions automatically to set and use the optimum gain. The method 200 returns 230 to start 202 and may be scheduled to run continuously to continuously update the gain setting. In embodiments, the method 200 may be scheduled to run on a timed routine with a delay between gain updates, such as to reduce the use of computational resources.

Employing an instrumented hitch 25, such as with the hitch load sensor 111, provides a benefit of high accuracy and good dynamic response to changing vehicle or road conditions. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for scaling a trailer brake gain of a trailer having trailer brakes and towed by a vehicle having vehicle brakes, the method comprising:
    obtaining sensor data via one or more sensors of the vehicle, including from a hitch load sensor;
    computing, by at least one processor and based on the sensor data, a trailer resistance force of the trailer;
    computing, by the at least one processor and using the sensor data, an optimum hitch force as a function of a vertical force on a hitch of the vehicle and deceleration of the vehicle;
    updating, automatically by the at least one processor, the trailer brake gain based on the optimum hitch force, the sensor data and the trailer resistance force; and
    scaling, by the at least one processor and using the updated trailer brake gain, the trailer brakes in response to application of the vehicle brakes, and applying the trailer brakes using the updated trailer brake gain.

2. The method of claim 1, wherein the obtaining sensor data includes, obtaining the vertical force on the hitch of the vehicle, a longitudinal force on the hitch of the vehicle, a speed of the vehicle, an acceleration of the vehicle, and a steering angle of the vehicle.

3. The method of claim 1, wherein the computing, by the at least one processor, the optimum hitch force includes computing using $$F_{xt-opt} = F_{zt}\left(\frac{a_{x\text{-}avg.}}{g}\right) + F_{RT}$$

where $F_{zt}$ is the vertical force on the hitch, $a_{x\text{-}avg}$ is the deceleration of the g vehicle averaged over time, g is acceleration of gravity and $F_{RT}$ is resistance force of the trailer.

4. The method of claim 1, wherein the optimum hitch force comprises an optimum longitudinal hitch force, wherein the updating the trailer brake gain includes adjusting the trailer brake gain by a gain change value that is based on an error between the optimum longitudinal hitch force and an actual average longitudinal hitch force.

5. The method of claim 1, comprising estimating the trailer resistance force based on resistance force coefficients that are computed only when the vehicle is not braking.

6. The method of claim 1, wherein the optimum hitch force comprises an optimum longitudinal hitch force, and comprising computing, by the at least one processor, the trailer brake gain based on the optimum longitudinal hitch force that is a function of the trailer resistance force.

7. The method of claim 1, wherein the optimum hitch force comprises an optimum longitudinal hitch force, and comprising:
    computing the optimum longitudinal force applied by the trailer to the hitch of the vehicle as the function of a vertical force of the trailer on the hitch of the vehicle, acceleration, and the trailer resistance force.

8. The method of claim 1, comprising:
    computing an actual longitudinal hitch force;
    wherein the optimum hitch force comprises an optimum longitudinal hitch force; and
    computing a product of a gain constant multiplied by a difference between the actual longitudinal hitch force and the optimum longitudinal hitch force.

9. The method of claim 1, wherein the updating is accomplished entirely and independently by the processor without manual input.

10. The method of claim 1, comprising computing, by an identifier module, the trailer resistance force using an identification method.

11. A system for scaling a trailer brake gain of a trailer having trailer brakes and towed by a vehicle having vehicle brakes, the system comprising:
    sensors of the vehicle providing sensor data, including a hitch load sensor; and
    at least one processor configured to:
        compute, based on the sensor data, a trailer resistance force of the trailer;
        compute an optimum hitch force as a function of a vertical force on a hitch of the vehicle and deceleration of the vehicle;
        automatically update the trailer brake gain based on the optimum hitch force, the sensor data and the trailer resistance force; and
        scale, using the updated trailer brake gain, the trailer brakes in response to application of the vehicle brakes, and apply the trailer brakes using the updated trailer brake gain.

12. The system of claim 11, wherein the vehicle includes the hitch for coupling with the trailer, wherein the sensor data includes the vertical force on the hitch, a longitudinal force on the hitch, a speed of the vehicle, an acceleration of the vehicle, and a steering angle of the vehicle.

13. The system of claim 11, wherein the optimum hitch force comprises an optimum longitudinal hitch force, wherein the at least one processor is configured to compute the optimum longitudinal force as a function of the vertical force on the hitch of the vehicle, the trailer resistance force, and deceleration of the vehicle.

14. The system of claim 11, wherein the optimum hitch force comprises an optimum longitudinal hitch force, wherein, when the trailer brake gain is automatically updated, the processor is configured to adjust the trailer brake gain by a gain change value that is based on an error between the optimum longitudinal hitch force and an actual average longitudinal hitch force.

15. The system of claim 11, wherein the trailer resistance force is estimated based on resistance force coefficients that are computed only when the vehicle is not braking.

16. The system of claim 11, wherein the optimum hitch force comprises an optimum longitudinal hitch force, wherein the at least one processor is configured to compute the trailer brake gain based on the optimum longitudinal hitch force that is a function of the trailer resistance force.

17. The system of claim 11, wherein the optimum hitch force comprises an optimum longitudinal hitch force, wherein the at least one processor is configured to compute the optimum longitudinal force applied by the trailer to the hitch of the vehicle as a function of acceleration, the trailer resistance force, and the vertical force of the trailer on the hitch of the vehicle.

18. The system of claim 11, wherein the optimum hitch force comprises an optimum longitudinal hitch force, wherein the at least one processor is configured to:
   compute an actual longitudinal hitch force;
   compute the optimum longitudinal hitch force; and
   compute a product of a gain constant multiplied by a difference between the actual longitudinal hitch force and the optimum longitudinal hitch force.

19. The system of claim 11, wherein the processor is configured to automatically update the trailer brake gain entirely and independently by the processor without manual input.

20. A vehicle comprising:
   a body configured to be coupled, via a hitch, to a trailer having a trailer braking system;
   one or more sensors configured to obtain sensor data for the vehicle, the sensor data including:
      a longitudinal force and a vertical force on the hitch; and
      a deceleration of the vehicle; and
   a processor that is coupled with the one or more sensors and that is configured to:
      compute, based on the sensor data, a trailer resistance force of the trailer;
      compute, based on the sensor data and the trailer resistance force an optimum force on the hitch;
      determine an error between the optimum force on the hitch and an actual force on the hitch that is obtained from the sensor data;
      automatically update a trailer brake gain to eliminate the error between the optimum force on the hitch and the actual force on the hitch; and
      scale, using the updated trailer brake gain, the trailer brakes in response to application of the vehicle brakes, and apply the trailer brakes using the updated trailer brake gain.

* * * * *

UNITED STATES PATENT AND TRADEMARK OFFICE
CERTIFICATE OF CORRECTION

PATENT NO. : 12,304,445 B2
APPLICATION NO. : 18/166966
DATED : May 20, 2025
INVENTOR(S) : Goodarzi et al.

It is certified that error appears in the above-identified patent and that said Letters Patent is hereby corrected as shown below:

In the Claims

Claim 3 - Column 13, Line 56 - should read, "deceleration of the vehicle averaged over time, g is", not "deceleration of the g vehicle averaged over time, g is".

Signed and Sealed this
Second Day of September, 2025

Coke Morgan Stewart
*Acting Director of the United States Patent and Trademark Office*